Sept. 6, 1966    W. M. CRAMPTON    3,270,567
CONTROL APPARATUS

Filed Sept. 11, 1961    5 Sheets-Sheet 1

INVENTOR.
WILLIAM M. CRAMPTON
BY Roger W. Hansen
ATTORNEY

Sept. 6, 1966  W. M. CRAMPTON  3,270,567
CONTROL APPARATUS

Filed Sept. 11, 1961  5 Sheets-Sheet 2

INVENTOR.
WILLIAM M. CRAMPTON
BY Roger W. Jensen
ATTORNEY

Sept. 6, 1966  W. M. CRAMPTON  3,270,567
CONTROL APPARATUS

Filed Sept. 11, 1961  5 Sheets-Sheet 3

INVENTOR.
WILLIAM M. CRAMPTON
BY Roger W. Jensen
ATTORNEY

INVENTOR.
WILLIAM M. CRAMPTON

ATTORNEY

United States Patent Office 3,270,567
Patented Sept. 6, 1966

3,270,567
CONTROL APPARATUS
William M. Crampton, White Bear Lake, Minn., assignor to Honeywell Inc., a corporation of Delaware
Filed Sept. 11, 1961, Ser. No. 137,288
14 Claims. (Cl. 74—5.6)

This invention pertains to means, in combination with a support member and a spherically shaped rotor member universally supported thereon and adapted to rotate relative to said support about a spin axis, for sensing and measuring relative rotation between the support member and the rotor member about any axis which is at an angle to the spin axis.

The present invention has application to the specific field of gyroscopic instruments although this is not the only application. In a gyroscopic instrument utilizing the present invention there is provided a spherically shaped rotor element universally supported by suitable means on a support. The rotor element has a fixed spin axis and will tend to remain fixed in inertial space except for precession caused by the application of torques thereto. Relative rotation between the support member and the rotor element is detected by a unique pickoff arrangement provided by the present invention. It has heretofore been suggested to have a pickoff arrangement between a spherically shaped rotor and a support means therefor comprising in part a plurality of coded latitude lines, i.e., each of a plurality of latitude lines on the surface of the rotor element having its own unique coding by means of which it may be individually identified. This arrangement is the subject matter of a copending application of Ralph D. Ormsby entitled "Control Apparatus," filed August 24, 1961, Serial No. 133,644 now Patent Number 3,154,953 and assigned to the same assignee as the present invention.

The present invention is an improvement over the arrangement disclosed in said Ormsby application. The present invention in one specific embodiment comprises a plurality of immediately adjacent coded latitude lines on the surface of the rotor, the lines being alternately substantially radiative and substantially non-radiative. The lines further have a characteristic coding arrangement of radiative and non-radiative portions arranged about 180° of rotor periphery. The coding is arranged so that the coding on one line is adjacent to the non-coded portion of the adjacent lines. One aspect of my invention therefore is to provide in a pickoff of the type described a plurality of coded latitude lines on a substantially spherically shaped rotor with each of the lines having a characteristic coding arrangement of radiative and non-radiative portions arranged about a portion of the rotor periphery and a non-coded portion on at least part of the remaining rotor periphery, the coding on one line being adjacent a non-coded portion of the adjacent lines.

My arrangement constitutes a substantial improvement over the arrangement disclosed in said Ormsby application because it permits much finer readings or measurements of relative rotation between the rotor element and its support. For the present arrangement there is no ambiguity in the output signals due to the alternate coding of lines. With this arrangement the code on one line does not interfere or conflict with the code on adjacent lines. The present arrangement also advantageously may be combined with additional means for producing fine readout signals or interpolating the position between adjacent lines. One aspect of the present invention is to provide unique fine readout arrangements.

An object of this invention therefore is to provide an improved control apparatus and more specifically to provide an improved pickoff arrangement for measuring relative rotation between a substantially spherical rotor element and its support.

Another object of the invention is to provide an improved pickoff of the coded latitude line type for measuring relative rotation between a substantially spherical rotor element and its support.

Other and more specific objects of the invention, including constructional details of pickoffs and systems utilizing the same embodying my invention, will be set forth more fully in and become apparent from a reading of the following specification and appended claims, in conjunction with the accompanying drawings in which:

Figure 1:
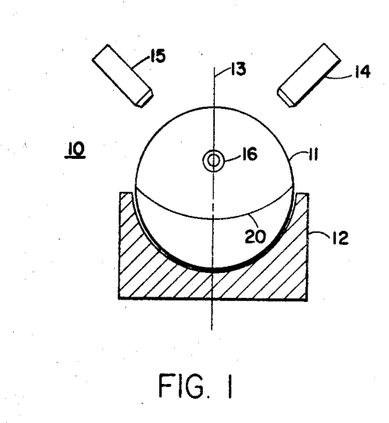
FIGURE 1 is a schematic representation of a gyroscope comprising a substantially spherically shaped rotor element universally supported on a support means and having associated with it three orthogonally positioned radiation sensor devices.

Referring to FIGURE 1, the reference numeral 10 generally depicts a gyroscope having a substantially spherically shaped rotor element 11 universally supported relative to suitable support means 12. No specific details of support means have been shown since they form no direct part of the present invention. It will be understood by those skilled in the art that various arrangements such as an air bearing or the like could be used for supporting the rotor 11 for rotation about a spin reference axis 13, the rotor 11 being impelled by a suitable rotation impelling means not shown. The present invention may be utilized with the rotor rotating at a constant angular rate or for a varying angular rate of rotation.

Figure 2:
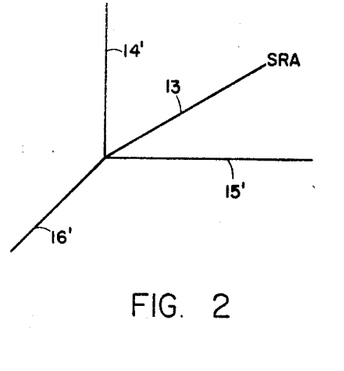
FIGURE 2 represents the sensing axes of the radiation sensors with respect to the spin reference axis of the gyroscope.

A plurality of suitable radiation sensors 14, 15 and 16 are located and positioned by suitable means so as to receive radiation from the rotor element 11. As depicted the sensors 14, 15 and 16 are orthogonally located with respect to each other, this being clearly shown in FIGURE 2 where the sensitive axes are respectively identified by reference numerals 14', 15' and 16'. The spin reference axis 13 of the rotor 11 is also depicted in FIGURE 2. It will be understood that if the rotor 11 and support 12 have relative rotation therebetween there will be relative rotation also between the spin reference axis 13 and the sensing axes 14', 15' and 16' of the radiation sensors.

Figure 3:
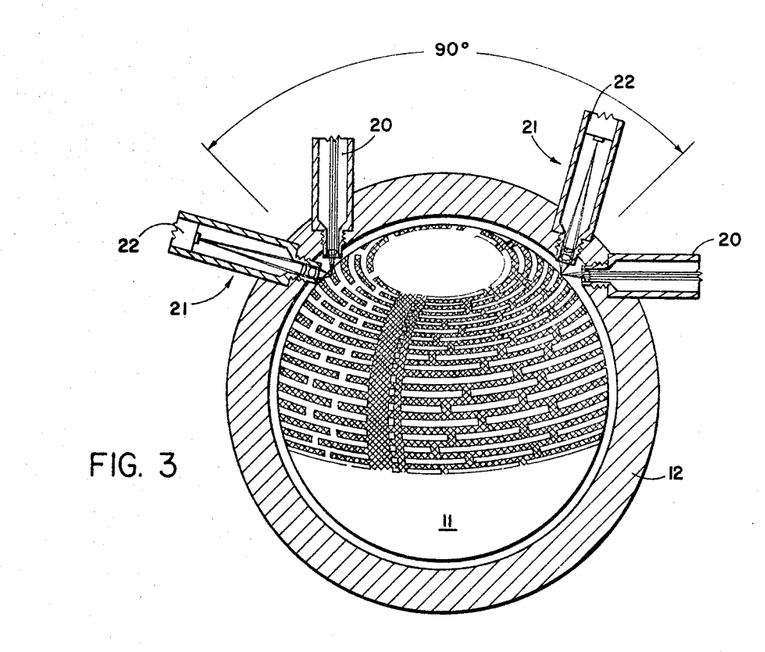
FIGURE 3 is a perspective view of a gyroscope having a substantially spherical rotor element with one embodiment of my improved pickoff arrangement thereon.

In FIGURE 3 the rotor 11 is shown positioned within a hollow spherical housing 12. Pickoffs 14 and 15 are shown in this view, the pickoffs being arranged 90° from one another. Any suitable type of radiation sensor may be utilized. The specific arrangement shown includes each of the pickoffs having a light producing means 20 and a light or radiation sensor housing 21 including a light or radiation sensor per se 22.

Figure 4:
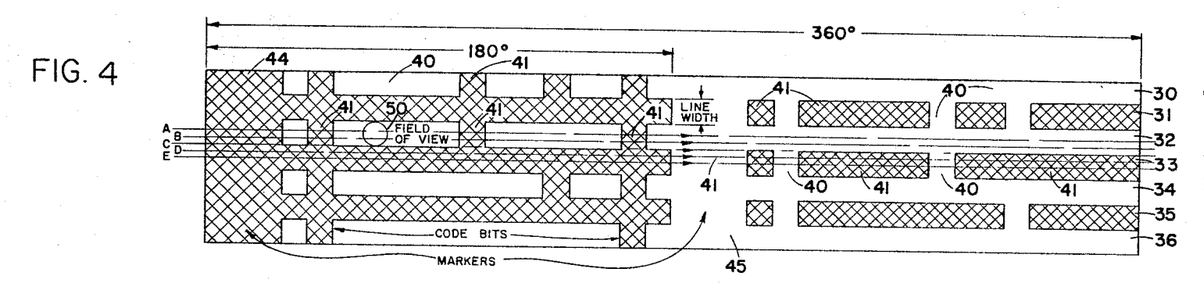
FIGURE 4 is an enlarged view of a plurality of coded lines for one embodiment of my invention.

On the surface of the rotor 11 are provided a plurality of immediately adjacent coded latitude lines, the lines being alternately substantially radiative and substantially non-radiative. Further, each of the lines has a characteristic coding arrangement of radiative and non-radiative portions arranged about 180° of rotor periphery, the coding on a substantially radiative line being adjacent the non-coded portion of the adjacent non-radiative lines. The particular coding arrangement provided by the present invention may be understood better by reference to FIGURE 4 which depicts one embodiment and specifically shows an enlarged view of a plurality of lines coded in the manner described above. In FIGURE 4, seven individual coded latitude lines 30 through 36 inclusive are shown. It will be noted that lines 30, 32, 34, and 36 are predominantly or substantially radiative while lines 31, 33, and 35 are predominantly or substantially non-radiative. In FIGURE 4, 360° of rotor periphery is depicted. It will be noted that in this embodiment of the invention each substantially radiative line has a substantially non-radiative line on both sides thereof. It will be also noted that the lines are immediately adjacent to one another.

Each of the lines 30 through 36 has a characteristic coding of radiative and non-radiative portions arranged about 180° of rotor periphery. Lines 30, 32, 34, and 36 are coded in the first 180° of rotor periphery while lines 31, 33, and 35 are coded in the last 180° of rotor periphery. Stated in another way, each of the lines has a characteristic coding of radiative and non-radiative portions arranged about a portion of rotor periphery and a non-coded portion on another portion of the rotor periphery, the coding on one line being adjacent to the non-coded portion of the adjacent lines.

In FIGURE 4 the reference numeral 40 has been used to designate radiative portions and reference numeral 41 has been used to designate non-radiative portions. The code depicted in FIGURE 4 is characterized by having two "marker" strips or bands, the utility of which will be described below in connection with FIGURES 8 through 10. The first marker strip is a non-radiative portion identified by the reference numeral 44 and extending continuously in a direction transverse to the latitude lines. The second marker strip is located substantially 180° from the first marker strip and is substantially radiative in nature and is identified by the reference numeral 45. Marker strip 45 also extends transverse to the latitude lines.

In this specification and claims the expressions or terms "radiation" and "radiative" shall be understood to include a wide variety of surface properties and conditions of the rotor element 11. The specific embodiments depicted herein will be described in connection with surfaces which are either light reflective or non-light reflective however it will be understood that the invention may be practiced by having surfaces which are either radiative or non-radiative in other senses. Examples of other arrangements include fluorescent or non-fluorescent, and opaque or translucent or transparent. Other arrangements such as using magnetic fields or radioactive techniques will occur to those skilled in the art.

The pickoffs 14, 15 and 16 are arranged so that the axes of the respective light producing means 20 and light responsive means 21 intersect at substantially the same point on the surface of the rotor element 11. Generally the "field of view" of the light responsive means 21 is a circular one and preferably has a diameter substantially the same as the width of one of the individual lines. The field of view has been identified in FIGURE 4 by the reference numeral 50 and it will be noted that it is shown to be the same latitude as the coded latitude line 32. It will be noted that the diameter of the field of view 50 is the same as the width of the latitude line 32.

It will be understood that the field of view remains relatively fixed while the rotor with the pattern thereon rotates past the field of view. It will be understood that when the individual pickoffs are "seeing" or viewing a non-radiative portion they will have an output of one sense while when viewing or seeing a radiative portion they will have an output of the opposite sense.

Figure 5:
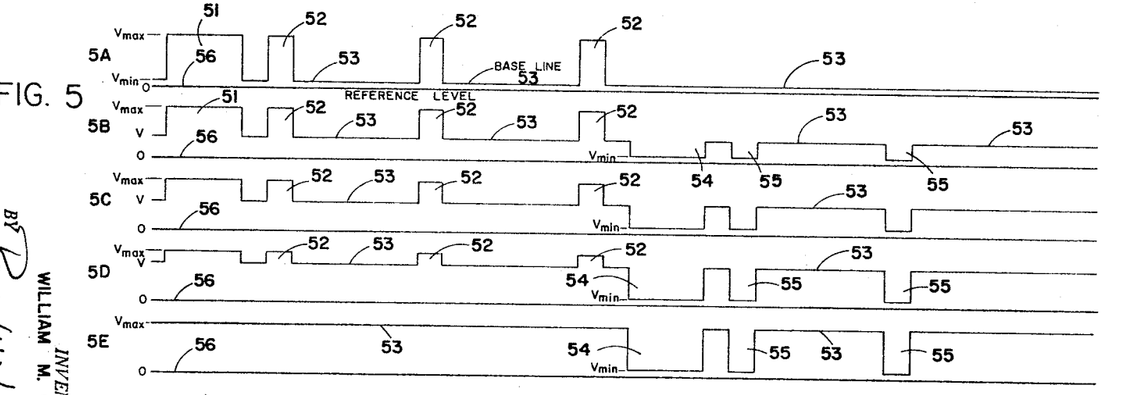
FIGURE 5 depicts various voltage waveforms representing output signals from a pickoff viewing different portions of the pattern shown in FIGURE 4.

FIGURE 5 depicts the output from one of the pickoffs for five different relationships between the field of view and the rotor pattern. In FIGURE 4 five different levels or relationships are indicated by the dotted lines A, B, C, D, and E. In FIGURE 5 outputs for these five different relationships are indicated respectively by portions 5A, 5B, 5C, 5D, and 5E. Arbitrarily the pickoffs are indicated to have a maximum voltage output when the field of view is viewing a non-radiative portion while having a minimum output when viewing a radiative portion. As will be well understood by those skilled in the art, the opposite arrangement could be used equally as well.

Relationship A in FIGURE 4 is with the field of view fully aligned or in register with coded latitude line 32. Position E corresponds to the field of view 50 being in full register with coded latitude line 33. Portions B, C and D depict intermediate positions between positions A and E and accordingly the field of view 50 for the intermediate positions B, C and D will be viewing or sensing code from both lines 32 and 33. This is clearly indicated in FIGURE 5. For example in FIGURE 5A it will be noted that there are pulsed outputs only during the first 180° of rotor rotation. The marker pulse is identified by reference numeral 51 and it will be noted that this is a positive going pulse. The pulses corresponding to the field of view 50 viewing non-radiative portions 41 are also postiive going pulses and are identified by the reference numeral 52. The output signal for the remaining portions of the waveform are at a relatively low level in this case, this level being identified as the base line having the reference numeral 53. The main reference level for the entire waveform depicted in FIGURE 5A is identified by the reference numeral 56.

At position B the field of view still sees most of coded latitude line 32 but begins to see part of coded latitude line 33 which is immediately adjacent. The marker pulse 51 and digit pulses 52 are still quite evident in FIGURE 5B. It will be noted that the base line 53 has a greater magnitude with respect to reference level 56 in FIGURE 5B as compared to FIGURE 5A. This variation is utilized for fine readout means as will be described below. The coding of coded latitude line 33 also is discernable in FIGURE 5B, the pulses produced by the code on line 33 being negative going pulses with respect to the base line 53. More specifically the negative going pulse caused by the marker strip 45 is identified by the reference numeral 54 while the negative going pulses caused by the individual digits are identified by the reference numeral 55. As the field of view shifts from full register with coded latitude line 32 to full register with coded latitude line 33, the height of the pulses 51 and 52 with respect to the base line 53 decreases while conversely the magnitude of the pulses 54 and 55 with respect to the base line 53 increases. FIGURE 5E depicts the arrangement E of FIGURE 4 where the field of view 50 is in full register with coded latitude line 53 and accordingly "sees" none of coded latitude line 32. For this arrangement the base line 53 is at a maximum and also there is a maximum magnitude in the pulses 54 and 55 with respect to the base line 53.

It will be noted from FIGURES 4 and 5 that the coding on one line does not conflict or interfere with the coding on an adjacent line. This is clear in the example where the coding from line 32 appears in the first 180° of signal output while the coding of line 33 occurs in the remaining 180° of signal output.

Figure 6:
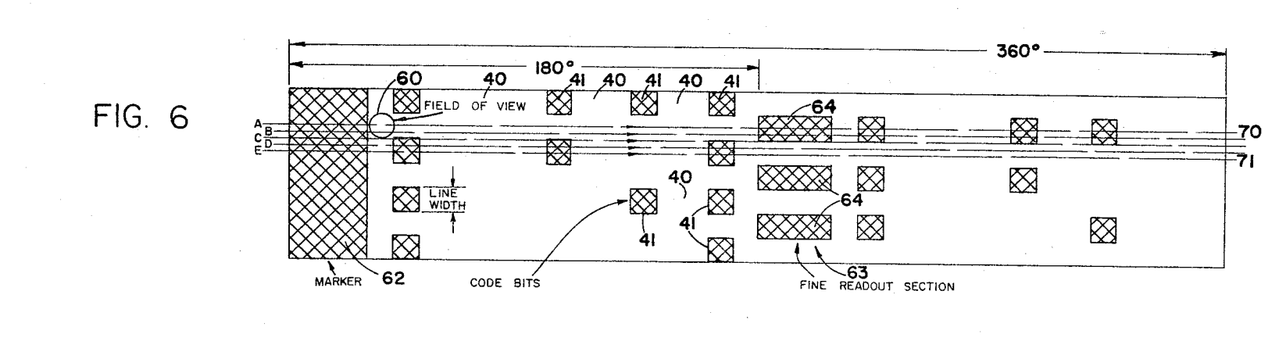
FIGURE 6 depicts an alternate pattern arrangement or embodiment of my invention.
Figure 7:
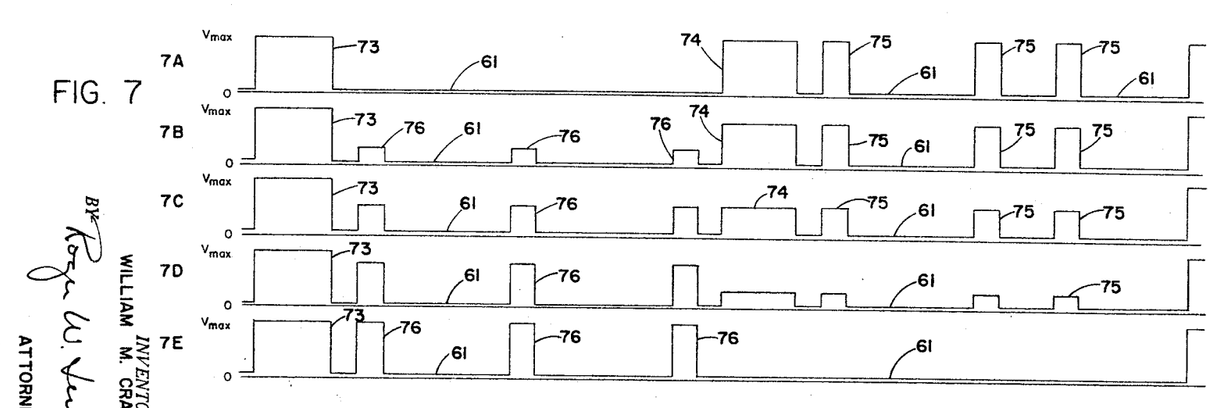
FIGURE 7 depicts various voltage waveforms representing output signals from a pickoff viewing different portions of the pattern shown in FIGURE 6.

FIGURE 6 shows an alternate arrangement or embodiment of my invention. Again a coded latitude line pattern is provided with adjacent lines coded 180° apart. The main difference between the pattern of FIGURE 6 as compared to the pattern on FIGURE 4 is that the pattern of FIGURE 6 does not have distinct lines of a radiative or non-radiative nature but only code breaks. Again the width of a line and the diameter of the field of view identified by the reference numeral 60 are the same. As in FIGURE 4, the reference numerals 40 and 41 identify radiative and non-radiative portions respectively. With the arrangement of FIGURE 6, the base lines does not change with respect to the reference level as was the case for FIGURE 4. In the various views of FIGURE 7 the base line is identified by the reference numeral 61 and it will be noted that all of the pulses including both the marker pulses and the digit pulses are positive going with respect to the base line. The pattern on FIGURE 6 includes a marker strip 62 which is depicted as being non-radiative. It has a continuous longitudinal extent. A fine readout section 63 includes a plurality of markers 64 located on alternate lines. The field of view 60 is shown in five separate relationships indicated by dotted lines A, B, C, D and E with respect to two adjacent lines of code breaks, these lines being identified by reference numerals 70 and 71, line 70 corresponding to position A of the field of view while line 71 corresponds with position E of the field of view. The positive going pulse produced by the marker strip 62 is identified by reference numeral 73 and it will be noted that this positive going pulse has a constant magnitude regardless of relationship between the field of view 60 and the lines on the rotor. In position A depicted in FIGURE 7A, the field of view 60 receives no coded information from line 71 but does produce positive going pulses coresponding to the coded information in line 70 including a positive going fine readout pulse 74 and positive going digit pulses 75. In position B the coding on line 71 begins to be apparent during the first 180°, the positive going pulses corresponding to the digits in this line being identified by reference numeral 76. In position B and as depicted in FIGURE 7B the height of the fine readout pulse 74 and the digit pulses 75 is less than the corresponding pulses in FIGURE 7A. As the field of view moves from position A to position E the pulses 76 increase in magnitude while pulses 74 and 75 decrease in magnitude. Finally in position E an extreme has been reached whereat pulses 76 are at a maximum while pulses 74 and 75 have decreased to zero with respect to base line 61.

Figure 8:
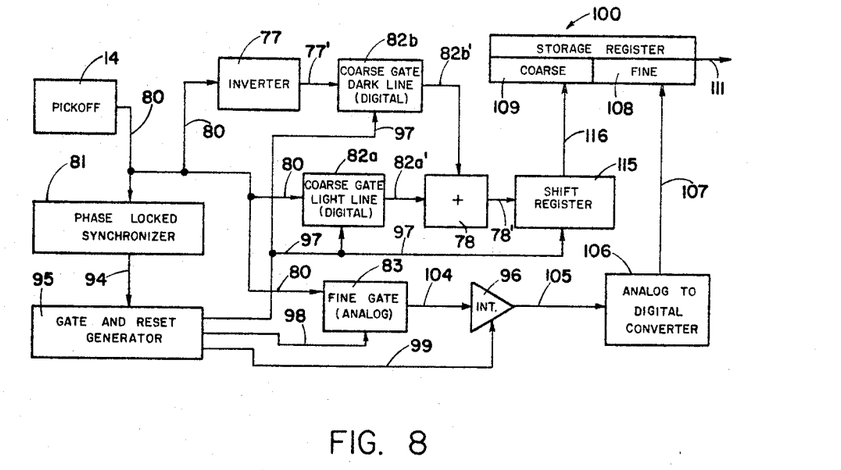
FIGURE 8 shows a schematic representation of one readout system provided by my invention.
Figure 10:
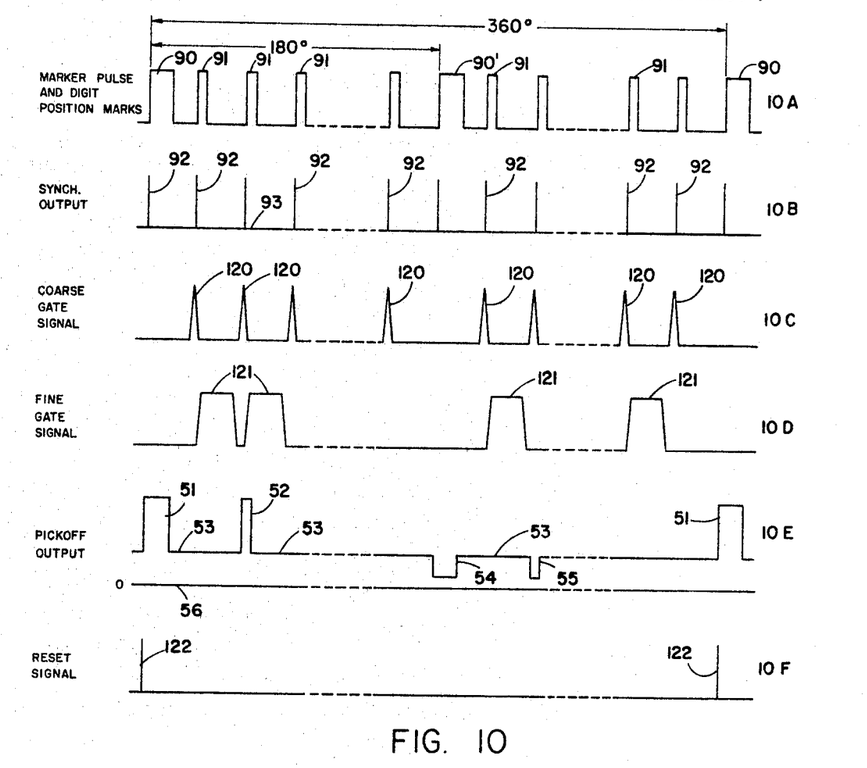
FIGURE 10 depicts a timing chart with waveforms thereof correlated with FIGURES 8 and 9.

FIGURE 8 shows one arrangement for utilizing the output from one of the pickoffs and further depicts one specific arrangement of fine readout. The pickoff 14 is shown in block diagram form having an output 80 which is applied to a suitable phase locked sychronizer 81, to a first coarse gate 82a, to an inverter 77, and to a fine gate 83. The inverter 77 has an output 77' which is applied to a second coarse gate 82b. The coarse gates 82a and 82b have outputs 82a' and 82b' respectively which are applied as inputs to a suitable summing means 78 which has an output 78'. Synchronizer 81, gates 82a, 82b, and 83, and summing means 78 may be any suitable type well known to those skilled in the art for providing the intended function. Gates 82a and 82b are "digital" gates and gate 83 is an "analog" gate. Synchronizer 81 functions to receive an output from the pickoff and to produce a plurality of timing pulses which are sychronized with the speed of rotation of the rotor. Thus, even if there is a change in angular velocity of the rotor 11 relative to the support 12, the output of the synchronizer 81 will change accordingly so as to remain synchronized with the rotor. Referring to FIGURE 10A, a typical marker pulse and digit position mark arrangement of a coded latitude line is shown. It should be understood that 360° of rotor periphery is depicted in FIGURE 10. The marker pulses corresponding to marker strips 44 and 45 are identified by reference numerals 90 and 90' respectively and the individual digit position marks are identified by reference numeral 91. It will be understood that FIGURE 10A depicts the maximum number of digit position marks on a coded latitude line having the maximum number of digits. It will be understood that the lines are coded by having characteristic arrangements of digit position marks. The output of synchronizer 81 is depicted in FIGURE 10B wherein a plurality of positive going pulses 92 extend above a base line 93 and correspond with the leading edge of the marker pulses 90 and 90' and digit position pulses 91.

It will be understood that the synchronizer output is synchronized to the signal from the pickoff 14. More specifically the synchronizer is synchronized with the marker pulses 90 and 90'.

The output signal of the synchronizer is applied through a suitable connection 94 to a suitable gate and reset generator 95, the details of which have not been shown but which are well known to those skilled in the art. The function of the gate and reset generator 95 is to produce a gating signal for the coarse gates 82a and 82b and fine gate 83 as well as a reset signal for a reset type of integrator 96. The coarse gate signal is shown in FIGURE 10C, the fine gate signal in FIGURE 10D and the reset signal in FIGURE 10F. The coarse gate output of gate and reset generator 95 is applied to gates 82a and 82b and to a shift register means 115 through a suitable connection 97, the connection to fine gate 83 by a connection 98 and to the integrator 96 by a connection 99.

Integrator 96 may be of any suitable type known to those skilled in the art for integrating an analog signal applied thereto until reset to zero. The fine gate 83 has an output 104 connected to the integrator 96. The integrator 96 in turn has an output 105 connected to a suitable analog to digital converter 106 which may be of any suitable type such as having a voltage to frequency converter in combination with a counter. Analog to digital converter 106 therefore functions to receive an analog signal output from the integrator 96 and converts it into digital form, the converter having an output 107 connected to the fine portion 108 of a suitable storage register 110, the storage register also having a coarse portion 109. The output 78' of summing means 78 is connected to a suitable shift register 115 which in turn has an output 116 connected to the coarse portion 109 of the storage register 110. The storage register 110 has an output 111 adapted to be connected to additional means not shown in this view.

FIGURE 10E depicts a typical output signal of pickoff 14, the waveform being of the type produced by the pickoff coacting with a pattern such as shown in FIGURE 4. The output includes a marker pulse 51 and a digit pulse 52. These are positive going pulses with respect to a base line 53. The output depicted in FIGURE 10E also includes a marker pulse 54 and a digit pulse 55. These are negative going pulses. It will be noted that the output depicted is incomplete for the full 360° of rotor rotation, specific codes for a dark line and an adjacent light line not being fully illustrated for space convenience. However it will be understood that the output of FIGURE 10E generally corresponds to FIGURES 5B to 5D in the sense that both a light line (pulses 51 and 52) and a dark line (pulses 54 and 55) are being decoded.

The marker pulses 51 and 54 coact with phase locked synchronizer 81 to produce the output depicted in FIGURE 10B and in due course the gate and reset generator 95 produces at outputs 97, 98 and 99 thereof the outputs depicted in FIGURES 10C, 10D and 10F. It will be noted that the coarse gate signal of FIGURE 10C has positive going pulses of short time duration coinciding with the leading edge of the digit position marks 91 of FIGURE 10A. These are identified by reference numeral 120. The fine gate output of generator 95 depicted in FIGURE 10D has a plurality of positive going pulses 121 of relatively long duration corresponding to the intervals between digit position marks 91 of FIGURE 10A. The reset output of generator 95 as depicted in FIGURE 10F includes a positive going pulse 122 of short time duration corresponding to the leading edge of each marker pulse 90.

*Operation of FIGURE 8 utilizing signals from a FIGURE 4 type of pattern*

Coarse gates 82a and 82b are gated by the signal depicted in FIGURE 10C. In addition gate 82a which is also designated as a "Light Line Digital Gate" receives a direct input from the pickoff 14 by output 80 thereof. Gate 82a functions to respond only to positive going pulses from the pickoff. It more specifically functions so that if there is a positive going pulse on input 80 thereof at the same time a gating pulse is received at input 97, it transmits a "1" to the summing means 78. If no pulse is applied to input 80 of gate 82a when a gating pulse is applied at 97, then gate 82a functions to apply a "0" to the summing means 78. It will be understood then that the gate 82a participates in the means for decoding only "Light Lines" and does not decode "Dark Lines." These latter lines are decoded by means including the inverter 77 and Dark Line Coarse Gate 82b. Inverter 77 functions in the well-known manner to invert the signal applied thereto. Accordingly, negative going pulses in the input thereof are "positive-going" in the output. This arrangement is used to permit the utilization of a gate 82b similar to gate 82a for applying to summing means 78 pulses indicative of "Dark Line" coding. More specifically, the negative going pulses 55 from a dark line, after being inverted, are applied at input 77' to dark line coarse gate 82b to cause "1's" to be applied to the summing means 78. For other conditions (no pulses applied at 77' when gate 82b is gated) a "0" is applied to the summing means 78. The output of the summing means 78' is applied to the shift register 115. As indicated above the coarse gate signal (FIGURE 10C) is applied by lead 97 to the shift register means 115. As is well understood each gating signal applied to the shift register does two things, the first of which is to insert either a "1" or a "0" at the input thereof depending upon the signal received from the coarse gates 82a and 82b through the summing means 78 and secondly (and simultaneously) to shift the contents of the shift register over one digit position. When the shift register 115 is filled (one rotor revolution) the contents are transferred to the storage register 100. Thus for 360° of rotor rotation a plurality of "1's" and "0's" will be applied to the shift register 115 and by well known arrangements this information will be shifted to the coarse portion 109 of the storage register 110. Simultaneous with the functioning of gates 82a and 82b, shift register 115, and storage register 110, the output from the pickoff 14 is also applied to gate 83 for fine readout purposes. The gate 83 in addition to the input 80 receives the fine gating signal depicted in FIGURE 10D. It is arranged so that it applies the output from pickoff 14 direct to the integrator 96 only when it is gated by the positive going pulses 121. It will be noted that this permits only the base line portion 53 of the pickoff output to be applied to the integrator 96. It will be remembered that it is the base line portion 53 which varies in an analog fashion as the field of view 50 moves from one line to another. Accordingly the integrator 96 has applied thereto an analog signal of varying magnitudes depending upon the relative position between the field of view of the coded latitude line or lines being viewed. The integrator 96 is reset once each 360° of rotor rotation by the reset pulses 122. This functions to clear the integrator at the beginning of each new revolution. The fine readout arrangement depicted in FIGURE 8 thus receives a signal from each fine readout area of the pickoff output and integrates the same so that the output 105 of integrator 96 represents the sum total of these signals or the average position of the base line 53 during one revolution.

The output signal from the integrator 96 is applied to the analog to digital converter 106 which functions to convert the analog signal received at input 105 thereof into digital form and to apply it to the fine register portion 108 of the storage register 110. Suitable means well known to those skilled in the art may be used to combine the information of the coarse and fine register portions of the storage register, this combined information being available at an output 111.

With respect to FIGURE 8 it will be understood that if the magnitude of the base line portion 53 of the pickoff output varies so too will the output of the integrator 96 vary to produce a corresponding change in the output of the analog to digital converter 106. Thus a fine readout arrangement is provided for interpolating or resolving rotor rotation between adjacent lines. The main coding of each individual line is applied through the coarse gates to the summing means and shift register 115 and from it as explained above to additional computer means so that the individual coded latitude lines may be identified. The present arrangement further provides the fine readout arrangement described for accurately measuring the distance between adjacent coded latitude lines. More specifically, computer means (such as item 150 to be described below in connection with FIGURE 11) connected to the output 111 of the storage register 100 functions in the well known manner to receive the coded information from the pickoffs. The computer sequentially receives a light line code and a dark line code and through well known means not specifically shown, correlates this information with the fine readout signal applied to the fine readout section 108 of the storage register 100. The computer means thus must interpret the fine readout signal with respect to the two lines being decoded. In effect the computer means will either add to or subtract from a particular coarse reading the fine readout signal so that the exact pickoff relationship with the rotor is determined.

Figure 9:
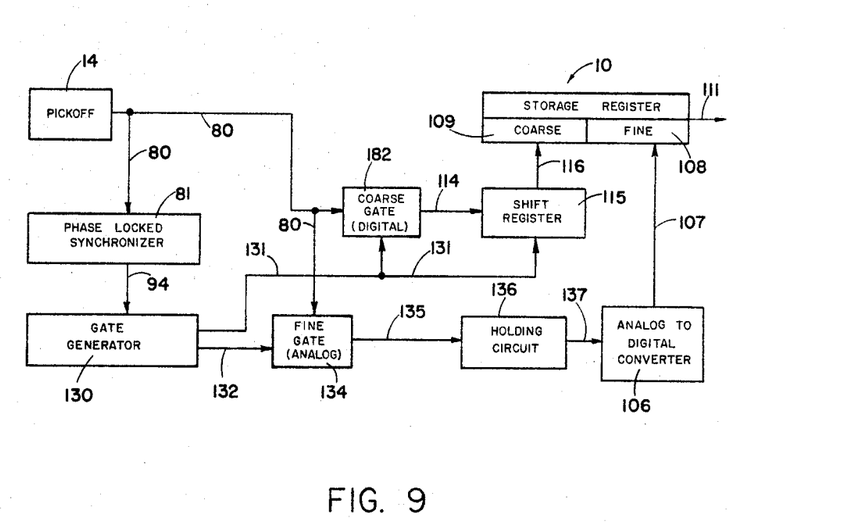
FIGURE 9 shows another readout embodiment of my invention.

*FIGURE 9*

FIGURE 9 depicts a somewhat modified readout arrangement as compared to the arrangement of FIGURE 8. Many of the elements depicted in FIGURE 9 may be identical to elements in FIGURE 8 and accordingly have the same reference numerals. One minor difference between FIGURE 8 and FIGURE 9 is that the coarse gate means of FIGURE 8 has been simplified as a single coarse gate (digital) 182 in FIGURE 9. It will be understood that it provides an equivalent function of the pair of coarse gates 82a and 82b in FIGURE 8. The main difference is that the arrangement of FIGURE 9 uses a holding circuit for producing a time average of the base line portion of the output signal from the pickoff instead of using the integrating arrangement of FIGURE 8. The gate and reset generator 95 of FIGURE 8 is replaced in FIGURE 9 by a gate generator which does not need to have a reset generator. The gate generator in FIGURE 9 has the reference numeral 130 having an output 131 connected to the coarse gate 82 and an output 132 connected to the fine gate identified by the reference numeral 134. The fine gate 134 has an output 135 connected to a holding circuit identified by the reference numeral 136. It in turn has an output 137 which serves as an input to the analog to digital converter 106. The details of holding circuit 136 have not been shown since they are well known to those skilled in the art. A device of this type is characterized by having a low impedance in one direction to charging currents but having a high impedance for current flow of the opposite sense. Holding circuit 136 functions to produce an output voltage indicative of the time average of the signal applied thereto. Thus at output 137 is produced a signal indicative of the time average of the base line portions 53 of the pickoff output.

*Operation of FIGURE 9 utilizing signals from a FIGURE 4 type of pattern*

The fine gate 134 in FIGURE 9 functions in a manner analogous to the fine gate 83 of FIGURE 8. To explain the fine gate 134 is gated by pulses 121 corresponding to the intervals between digit pulses 91. Fine gate 134 permits signals applied at input 80 thereof to be transmitted through to the output 135 only when it receives positive going gating pulses 121. Accordingly portions 51, 52, 54 and 55 of the pickoff output are prevented from being transmitted through the fine gate to the holding circuit. Conversely the base line portion 53 of the pickoff output which varies in magnitude according to the position of the field of view with respect to the lines is transmitted through the fine gate and applied to the holding circuit 136. It will be understood that as the magnitude of the base line 53 changes so too will the output signal of the holding circuit 136 change accordingly.

The remaining features of operation of the apparatus of FIGURE 9 are substantially the same as that of FIGURE 8. The coarse gate 182 as described above being gated by pulses 120 at input 131 thereof functions to apply "1's" to the shift register 115 when there are simultaneous digit pulses 52 at the input 80 thereof. Conversely, when no digit pulses 52 are received at input 80 thereof when a gated pulse 120 is applied, then a "0" is applied to the shift register 115.

*Operation of FIGURE 9 utilizing signals from a FIGURE 6 type of pattern*

The FIGURE 9 type of pickoff circuitry may be used with various patterns in addition to that of the FIGURE 4 type. For example it may be used with a FIGURE 6 type of pattern if slight modifications are made in the gating of the fine gate 134. Basically the fine readout of a FIGURE 6 type of pattern consists of gating only a single voltage sample per revolution of the rotor. For the particular arrangement depicted the gating of gate 134 occurs at the time of the pulses 74. This enables gate 134 and results in pulse 74 being applied once per rotor revolution to the holding circuit means 136. The holding circuit 136 holds the level of this pulse until the next revolution or input. Accordingly suitable means not specifically shown may be provided for gating the fine gate 134 only when pulses 74 are applied at input 80 thereof. In general the system of FIGURE 9 is applicable to a FIGURE 6 and 7 arrangement if there is recognition of the fact that all pulses are positive going so that no inversion is needed plus the changed timing for the fine gate 134 so that it is gated only once per revolution corresponding to pulse 74.

Figure 11:
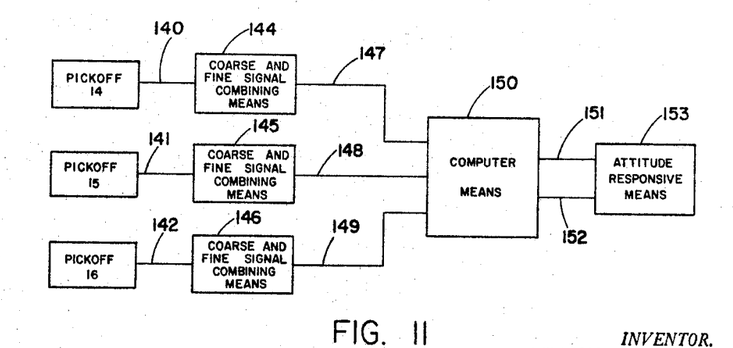
FIGURE 11 schematically depicts a system of three orthogonally positioned pickoffs, their associated coarse and fine signal combining means, computer means for receiving the outputs from the pickoffs, and attitude responsive means connected to the computer means.

FIGURE 11 shows in block diagram form how the present invention could be utilized in an attitude responsive system. In FIGURE 11 the pickoffs 14, 15 and 16 are depicted having outputs 140, 141, and 142 connected to suitable coarse and fine signal combining means 144, 145, and 146 respectively. It will be understood that the coarse and fine signal combining means 144 through 146 could well be of the type indicated in either FIGURE 8 or 9. They are depicted as having outputs 147, 148, and 149 respectively and are connected to a suitable computer means 150 having a pair of outputs 151 and 152. Computer outputs are shown connected to an attitude responsive means 153. It will be understood by those skilled in the art that the attitude responsive means could be indicator means or a control system of some suitable type such as autopilot means or an inertial navigation system. In the case where the present invention measures relative rotation between a gyroscopic rotor and a support therefor, the spin reference axis could be aligned with one of the principal axes of the craft upon which the gyro is mounted. For example the spin reference axis could be aligned with or parallel to the yaw axis of a dirigible craft and accordingly the present pickoff system would function to produce signals indicative of the roll and pitch of the craft about its corresponding roll and pitch axes.

It is not necessary to have the entire surface of the rotor 11 encoded when three orthogonally positioned pickoffs are used. In FIGURE 3 the rotor is shown with coded lines only on a portion of the surface. This has been done partially for convenience. In an arrangement where three orthogonally arranged pickoffs are used, it would be sufficient to have the coded lines extending from 45° North to 45° South, the designators "North" and "South" being arbitrary references with respect to an imaginary equator. It will be understood that other arrangements may occur to those skilled in the art with different numbers of pickoffs. With three orthogonally located pickoffs and coded lines extending between 45° North and 45° South latitude, it will be understood that the output from any two of the three pickoffs will be sufficient for providing the information to the computer for calculating the relative angular position between the spin axis of the rotor and its support. The third pickoff is redundant in some cases. However, there will be cases when one of the pickoffs is viewing a portion of the rotor surface that is not coded (such as when it is viewing one of the two poles). By having three orthogonally located pickoffs, it will be clear to those skilled in the art that all relative angular positions between the rotor and its support may be determined.

One feature that the computer means 150 may include would be one of the well known arrangements for introducing a compensation to compensate for the fact that the field of view of the pickoff is circular. The output signal of the pickoff is a function of the area of the field of view while it is desirous to have a fine readout signal proportional to displacement along the diameter. The computer accordingly would function to apply a linearization factor to the fine readout signal. This compensation should be achieved before the fine readout signal is combined with the coarse readout. The specific details have not been shown since they may be accomplished in many different ways and are well known to those skilled in the art.

The system arrangement of FIGURE 11 is only indicative of many arrangements which may be used with the present invention and is not shown in a limiting sense.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. In apparatus of the class described: a support; a spherically shaped rotor universally supported by said support and adapted to be rotated about a spin axis; and means for measuring relative rotation between said rotor and said support about any axis at an angle to said spin axis, said measuring means comprising a plurality of immediately adjacent coded latitude lines on said rotor, said lines being alternately substantially radiative and substantially non-radiative and each of said lines having a characteristic coding arrangement of radiative and non-radiative portions arranged about 180° of rotor periphery and having no code on the remaining 180° of rotor periphery, the coding on a substantially radiative line being adjacent the non-coded portion of the adjacent non-radiative lines, pickoff means adapted to sense radiation from said rotor including means for producing signals indicative of radiation sensed thereby, and computer means connected to said pickoff signal producing means.

2. In apparatus of the class described: a support; a spherically shaped rotor universally supported by said support and adapted to be rotated about a spin axis; and means for measuring relative rotation between said rotor and said support about any axis at an angle to said spin axis, said measuring means comprising a plurality of coded latitude lines on said rotor, said lines being alternately substantially radiative and substantially non-radiative and each of said lines having a characteristic coding arrangement of radiative and non-radiative portions arranged about 180° of rotor periphery and having no code on the remaining 180° of rotor periphery, and the coding on a substantially radiative line being adjacent the non-coded portion of the adjacent non-radiative lines.

3. In apparatus of the class described: a support; a substantially spherically shaped rotor universally supported by said support and adapted to rotate about a spin axis; and means for measuring relative rotation between said rotor and said support about any axis at an angle to said spin axis, said measuring means comprising a plurality of coded latitude lines on said rotor, said lines each having a characteristic coding arrangement of radiative and non-radiative portions arranged about 180° of rotor periphery and having no code on the remaining 180° of rotor periphery, the coding on one line being adjacent the non-coded portion of the adjacent lines.

4. In apparatus of the class described: a support; a substantially spherically shaped rotor universally supported by said support and adapted to rotate about a spin axis; and means for measuring relative rotation between said rotor and said support about any axis at an angle to said spin axis, said measuring means comprising a plurality of coded latitude lines on said rotor, said lines each having a characteristic coding arrangement of radiative and non-radiative portions arranged about a portion of rotor periphery and a non-coded portion on another portion of rotor periphery, the coding on one line being adjacent non-coded portions of the adjacent lines, pickoff means adapted to sense radiation from said rotor including means for producing signals indicative of radiation sensed thereby, and computer means connected to said pickoff signal producing means.

5. In apparatus of the class described: a support; a substantially spherically shaped rotor universally supported by said support and adapted to rotate about a spin axis; and means for measuring relative rotation between said rotor and said support about an axis at an angle to said spin axis, said measuring means comprising a plurality of coded latitude lines on said rotor, said lines each having a characteristic coding arrangement of radiative and non-radiative portions arranged about a portion of rotor periphery and a non-coded portion on the remaining rotor periphery, and the coding on one line being adjacent a non-coded portion of the adjacent lines.

6. Means for sensing relative rotation between a point on a support member and a spherically shaped rotor member universally supported on said support and adapted to rotate relative to said support about a spin axis, said means comprising a plurality of coded latitude lines on said rotor member, radiation responsive means mounted in radiative proximity with respect to said rotor member and having means for producing a signal indicative of radiation sensed thereby, said signal being characterized by having discrete pulses separated by a base line, and means connected to said signal producing means including fine readout means, said fine readout means including means for producing an analog signal indicative of a function of the magnitude of only said base line.

7. Means for sensing relative rotation between a point on a support member and a spherically shaped rotor member universally supported on said support and adapted to rotate relative to said support about a spin axis, said means comprising a plurality of coded latitude lines on said rotor member, radiation responsive means mounted in radiative proximity with respect to said rotor member and having means for producing a signal indicative of radiation sensed thereby, said signal being characterized by having discrete pulses separated by a base line, and means connected to said signal producing means including fine readout means, said fine readout means including means for producing an analog signal indicative of a function of the magnitude of only a portion of said signal.

8. Means for sensing relative rotation between a point on a support member and a spherically shaped rotor member universally supported on said support and adapted to rotate relative to said support about a spin axis, said means comprising a plurality of coded latitude lines on said rotor member, radiation responsive means mounted in radiative proximity with respect to said rotor member and having means for producing a signal indicative of radiation sensed thereby, said signal being characterized by having discrete pulses separated by a base line, and means connected to said signal producing means including fine readout means, said fine readout means including means for producing an analog signal indicative of the time average of the magnitude of only said base line portion of said signal.

9. Means for sensing relative rotation between a support member and a spherically shaped rotor member universally supported on said support and adapted to rotate relative to said support about a spin axis, said means comprising a plurality of coded latitude lines on said rotor member, radiation responsive means mounted in radiative proximity with respect to said rotor member and having means for producing a signal indicative of radiation sensed thereby, said signal being characterized by having discrete pulses separated by a base line, and means connected to said signal producing means for producing a signal indicative of a function of the base line portion of said signal.

10. Means for sensing relative rotation between a support member and a spherically shaped rotor member universally supported on said support and adapted to rotate relative to said support about a spin axis, said means comprising a plurality of coded latitude lines on said rotor member, radiation responsive means mounted in radiative proximity with respect to said rotor member and having means for producing a signal indicative of radiation sensed thereby, said signal being characterized by having pulse portions separated by base line portions, and means connected to said signal producing means for producing a signal indicative of a function of only certain of said portions of said signal.

11. In apparatus of the class described: a support; a substantially spherically shaped rotor universally supported by said support and adapted to rotate about a spin axis; and means for measuring relative rotation between said rotor and said support about an axis at an angle to said spin axis, said measuring means comprising a plurality of coded latitude lines on said rotor, said lines each having a characteristic coding arrangement of radiative and non-radiative portions arranged about a portion of rotor periphery and a non-coded portion on the remaining rotor periphery, and the coding on one line being adjacent the non-coded portion of the adjacent lines, and a plurality of pickoffs adapted to sense radiation from said rotor including means for producing signals indicative of radiation sensed thereby, phase locked synchronizer means, gate generator means, coarse gate means, fine gate means, integration means, analog to digital conversion means, shift register means, coarse storage register means, fine storage register means, means including said coarse gate means connecting said signal producing means to said shift register means, means including said fine gate means connecting said signal producing means to said integration means, means connecting said signal producing means to said phase locked synchronizer means, means connecting said phase locked synchronizer means to said gate generator means, means connecting said gate generator means to said coarse gate means, to said fine gate means, and to said integration means, means connecting said shift register means to said coarse storage register means, means connecting said integration means to said analog to digital conversion means, and means connecting said analog to digital conversion means to said fine storage register means.

12. In apparatus of the class described: a support; a substantially spherically shaped rotor universally supported by said support and adapted to rotate about a spin axis; and means for measuring relative rotation between said rotor and said support about an axis at an angle to said spin axis, said measuring means comprising a plurality of coded latitude lines on said rotor, said lines each having a characteristic coding arrangement of radiative and non-radiative portions arranged about 180° of rotor periphery and a non-coded portion on the remaining rotor periphery, and the coding on one line being adjacent the non-coded portion of the adjacent lines, and pickoff means adapted to sense radiation from said rotor including means for producing signals indicative of radiation sensed thereby, phase locked synchronizer means, gate generator means, first gate means, second gate means, integration means, analog to digital conversion means, shift register means, coarse storage register means, fine storage register means, means including said first gate means connecting said signal producing means to said shift register means, means including said second gate means connecting said signal producing means to said integration means, means connecting said signal producing means to said phase locked synchronizer means, means connecting said phase locked synchronizer means to said gate generator means, means connecting said gate generator means to said first gate means, to said second gate means, and to said integration means, means connecting said shift register means to said coarse storage register means, means connecting said integration means to said analog to digital conversion means, and means connecting said analog to digital conversion means to said fine storage register means.

13. In apparatus of the class described: a support; a substantially spherically shaped rotor universally supported by said support and adapted to rotate about a spin sxis; and means for measuring relative rotation between said rotor and said support about an axis at an angle to said spin axis, said measuring means comprising a plurality of coded latitude lines on said rotor, said lines each having a characteristic coding arrangement of radiative and non-radiative portions arranged about a portion of rotor periphery and a non-coded portion on the remaining rotor periphery, and the coding on one line being adjacent the non-coded portion of the adjacent lines, and pickoff means adapted to sense radiation from said rotor including means for producing signals indicative of radiation sensed thereby, gate generator means, first gate means, second gate means, integration means, analog to digital conversion means, shift register means, coarse storage register means, fine storage register means, means including said first gate means connecting said signal producing means to said shift register means, means including said second gate means connecting said signal producing means to said integration means, means connecting said signal producing means to said gate generator means, means connecting said gate generator means to said first gate means, to said second gate means, and to said integration means, means connecting said shift register means to said coarse storage register means, and means connecting said analog to digital conversion means to said fine storage register means.

14. In apparatus of the class described: a support; a substantially spherically shaped rotor universally supported by said support and adapted to rotate about a spin axis; and means for measuring relative rotation between said rotor and said support about an axis at an angle to said spin axis, said measuring means comprising a plurality of coded latitude lines on said rotor, said lines each having a characteristic coding arrangement of radiative and non-radiative portions arranged about a portion of rotor periphery and a non-coded portion on the remaining rotor periphery, and the coding on one line being adjacent the non-coded portion of the adjacent lines, and a pickoff means adapted to sense radiation from said rotor including means for producing signals indicative of radiation sensed thereby, gate generator means, first gate means, second gate means, analog to digital conversion means, coarse storage register means, fine storage register means, means including said first gate means connecting said signal producing means to said coarse storage register means, means including said second gate means connecting said signal producing means to said analog to digital conversion means, and means connecting said analog to digital conversion means to said fine storage register means.

References Cited by the Examiner
UNITED STATES PATENTS

| | | | |
|---|---|---|---|
| 2,919,583 | 1/1960 | Parker | 74—5 |
| 2,948,813 | 8/1960 | Osborne | 74—5.47 |
| 2,959,060 | 11/1960 | Kunz | 74—5.6 |

FRED C. MATTERN, JR., *Primary Examiner.*

BROUGHTON G. DURHAM, *Examiner.*

T. W. SHEAR, *Assistant Examiner.*